United States Patent [19]
Meuleman

[11] 3,742,215
[45] June 26, 1973

[54] METHOD AND APPARATUS FOR A SEMICONDUCTOR RADIATION DETECTOR

[75] Inventor: Johannes Meuleman, Caen, France

[73] Assignee: U.S. Philips Corporation, New York, N.Y.

[22] Filed: Jan. 22, 1971

[21] Appl. No.: 108,799

[30] Foreign Application Priority Data

Jan. 26, 1970 France .............................. 7002619

[52] U.S. Cl. ..... 250/83 R, 317/235 AD, 317/235 N
[51] Int. Cl. .............................................. G01t 1/24
[58] Field of Search ..................... 250/83 R, 83.3 R; 317/235 N, 235 AD

[56] References Cited

UNITED STATES PATENTS

| | | | |
|---|---|---|---|
| 3,351,758 | 11/1967 | Armantrout et al. | 250/83.3 R |
| 3,131,305 | 4/1964 | Shombert | 250/83.3 R |
| 3,424,910 | 1/1969 | Mayer et al. | 317/235 AD X |

*Primary Examiner*—Archie R. Borchelt
*Attorney*—Frank R. Trifari

[57] ABSTRACT

Semiconductor nuclear detector and method of manufacturing the same, the detector comprising a semiconductor crystal having two outer regions of opposite conductivity types and separated by an intermediate, intrinsic region and each having a recess; these recesses are located opposite each other and have substantially similar configurations. One recess serves as an entrance window for the radiation and has a depth at least equal to the thickness of the outer region concerned, whereas contacts are made at the peripheries of said outer regions. The depth of the recess opposite that serving as an entrance window for the radiation is at least equal to the thickness of the outer region in which it is provided.

4 Claims, 2 Drawing Figures

INVENTOR.
BY JOHANNES MEULEMAN
AGENT

METHOD AND APPARATUS FOR A SEMICONDUCTOR RADIATION DETECTOR

The invention relates to a nuclear detector comprising a semiconductor crystal in which a first and a second outer region of opposite conductivity types are present which are separated by an intermediate, substantially intrinsic region the first outer region comprising a recess which serves as an entrance window for the radiation to be detected and which has a depth at least equal to the thickness of the first outer layer, contacts being connected to the second outer region and the peripheral portion of the first outer region.

The intrinsic region in detectors of this kind is usually mainly obtained by the compensation of a region initially of p-type conductivity by lithium.

The inverse polarisation of such a detector permits of obtaining an important space charge zone, the minimum thickness of which corresponds with that of the compensated region, whereas the maximum thickness is that of the compensated region increased by the space charge zones associated with the n-type region and the p-type region.

Since the useful zone of such a detector, that is to say the zone intended to capture the incident radiation, is the space charge zone, it is advantageous to reduce the thickness of the non-depleted zone exposed to the radiation, usually the p-type region, to the absolute minimum, and even to omit it locally, while the possibility of making a contact zone is maintained.

For this reason a detector of this kind, usually comprises in the region facing the incident radiation a recess, the depth of which is at least equal to the thickness of said region.

This recess forms the entrance window of the radiation and the subsisting peripheral portion of the p-type region is used for making a contact zone.

When a particle strikes the bottom of the recess, it penetrates into the space charge zone, where it produces electron-hole pairs, which generate an electric current pulse. This pulse may then be used for measuring the energy of the incident particle.

Such a detector has a planar structure formed by a crystal of a few hundred microns in thickness. Some particles pass through the whole thickness of the space charge zone without being absorbed. In order to obviate this disadvantage it is known to stack up a plurality of detectors in parallel one on the other. However, in this case the non-compensated and non-recessed external region of each of the stacked detectors constitutes a barrier for some particles.

The present invention obviates this disadvantage.

According to the invention a nuclear detector comprising a semiconductor crystal in which a first and a second outer region of opposite conductivity types are present, which are separated by an intermediate, substantially intrinsic region the first outer region comprising a recess, which serves as an entrance window for the radiation and which has a depth at least equal to the thickness of the first outer region contacts being connected to the second outer region and the peripheral portion of the first outer region, characterized in that the second outer region comprises a recess located opposite that serving as an entrance window for the radiation and having a substantially identical configuration, the depth of said recess of the second outer region being at least equal to the thickness of the second outer region.

Such a detector has on the one hand the advantages resulting from the provision of a recess in the region subjected to the radiation, that is to say, the reduction of the thickness of the disturbing layer between the useful zone and the surface on which the incident radiation impinges and on the other hand the advantage of not giving rise to any disturbance in the trajectory of the traversing radiation, if it is desired to stack up a plurality of similar detectors owing to the removal of part of the outer region opposite the part receiving the radiation.

Moreover, the application of contacts on the region opposite the radiation is similar to that on the outer region subjected to the incident radiation so that any risk of masking the radiation is avoided.

The present invention can be applied irrespective of the configuration of the crystal and of the recesses, which may be cylindrical or parallelopiped-shaped.

The following description given by way of non-limiting example with reference to the accompanying two FIGS. will show how the invention may be carried into effect.

Figure 1:
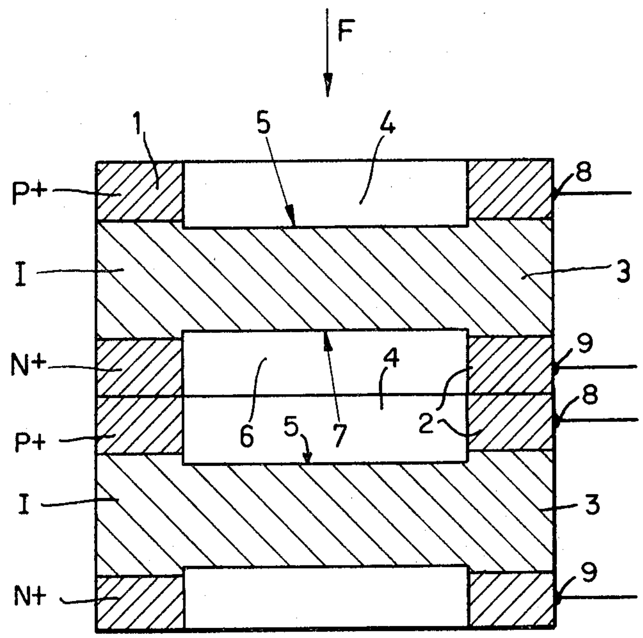
FIG. 1 is a schematic sectional view of a detector embodying the invention.
Figure 2:
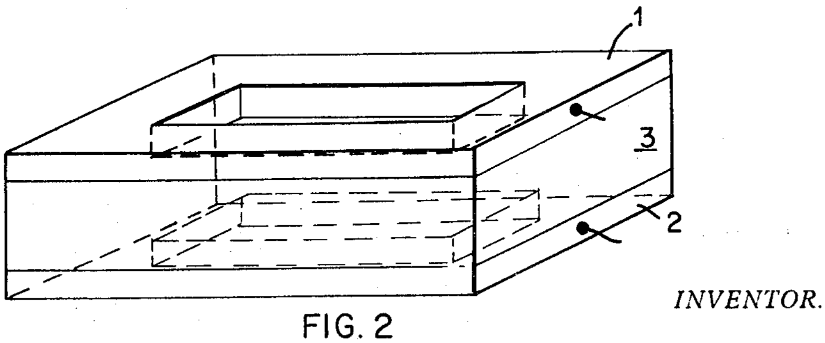
FIG. 2 is a perspective drawing of the detector.

It should be noted that in the Figures the dimensions are largely exaggerated and non-proportional for the sake of clarity.

The oxide layers at the surface resulting from the various operations are not shown. These protective layers are not referred to in this description, since their formation may be obtained by any known thermal or chemical treatment.

The detector according to the invention shown in the Figure comprises a semiconductor crystal having a p-type outer surface region 1, an n-type outer surface region 2 and an intermediate, intrinsic region 3, for example, obtained in known manner by lithium compensation. In the region 1, intended to receive the radiation indicated by the arrow F, a recess 4 is made by mechanical grinding and chemical etching, the bottom 5 of which is located in the compensated, intermediate region 3. In the region 2 is then made also by grinding and chemical etching a further recess 6, the bottom 7 of which is located in the compensated, intermediate region 3. The contacts 8 and 9 are formed on the peripheries of the recesses 4 and 5, either on the faces of the remaining parts of the regions 1 and 2, from which the recesses 4 and 6 have been made, or on the lateral walls of said remaining parts as shown.

Such a device may be obtained from a p-type substrate having a high impurity concentration by methods known to those skilled in the art. The region 2 may be obtained by deposition and a short diffusion at 450° C of n-type lithium impurity and the compensated region 3 may be obtained by penetration of lithium under inverse polarisation of the junction formed in the substrate during the preceding diffusion treatment.

The recesses 4 and 6 are preferably made by mechanical grinding by means of an appropriate tool and an abrasive suspended in a lubricant.

What is claimed is:

1. A nuclear detector comprising a semiconductor crystal in which a first and a second outer region of opposite conductivity types are present, an intermediate substantially intrinsic region is disposed between said first and second outer regions, said first outer region includes a recess, which serves as an entrance window for the radiation and which has a depth at least equal to the thickness of said first outer region, contacts are connected to the second outer region and the peripheral portion of the first outer region, and said second outer region includes a recess located opposite that serving as an entrance window for the radiation and having a substantially identical configuration, the depth of said recess of the second outer region being at least equal to the thickness of said second outer region.

2. A detector as claimed in claim 1 characterized in that the recesses are cylindrical.

3. A detector as claimed in claim 1 characterized in that the recesses have the shape of a parallelopiped.

4. A detector as claimed in claim 1, characterized in that a plurality of said detectors are stacked up so that their intermediate regions are parallel to each other and the n-type region of one detector is located opposite a p-type region of the adjacent detector.

* * * * *